(12) United States Patent
Hennessey

(10) Patent No.: US 10,001,241 B2
(45) Date of Patent: Jun. 19, 2018

(54) MICROPHONE STAND HAVING ARTICULATING SHAFT

(71) Applicant: James R. Hennessey, West Hartford, CT (US)

(72) Inventor: James R. Hennessey, West Hartford, CT (US)

(73) Assignee: The Music People, Inc., Berlin, CT (US)

( * ) Notice: Subject to any disclaimer, the term of this patent is extended or adjusted under 35 U.S.C. 154(b) by 28 days.

(21) Appl. No.: 15/183,127

(22) Filed: Jun. 15, 2016

(65) Prior Publication Data

US 2016/0298803 A1    Oct. 13, 2016

Related U.S. Application Data

(62) Division of application No. 14/834,649, filed on Aug. 25, 2015, now Pat. No. 9,719,627.

(60) Provisional application No. 62/041,226, filed on Aug. 25, 2014.

(51) Int. Cl.
| | |
|---|---|
| *A47B 19/00* | (2006.01) |
| *F16M 11/20* | (2006.01) |
| *F16M 11/28* | (2006.01) |
| *F16C 11/10* | (2006.01) |
| *H04R 1/08* | (2006.01) |
| *F16M 11/10* | (2006.01) |

(52) U.S. Cl.
CPC ....... *F16M 11/2021* (2013.01); *A47B 19/002* (2013.01); *F16C 11/103* (2013.01); *F16M 11/10* (2013.01); *F16M 11/28* (2013.01); *H04R 1/08* (2013.01); *A47B 2019/008* (2013.01); *F16M 2200/022* (2013.01); *F16M 2200/027* (2013.01)

(58) Field of Classification Search
USPC .......................... 248/371, 398, 395, 133, 139
See application file for complete search history.

(56) References Cited

U.S. PATENT DOCUMENTS

| | | | |
|---|---|---|---|
| 856,679 A | 6/1907 | Buckland | |
| 2,424,222 A | 7/1947 | Brown et al. | |
| 2,567,593 A * | 9/1951 | Bemis ................. | A47B 3/0818 108/148 |
| 2,738,999 A | 3/1956 | Olson | |

(Continued)

OTHER PUBLICATIONS

U.S. Office Action U.S. Appl. No. 14/834,649, dated Mar. 21, 2016, 6 Pages.

(Continued)

*Primary Examiner* — Nkeisha Smith
(74) *Attorney, Agent, or Firm* — Whitmyer IP Group LLC

(57) ABSTRACT

A stand includes a base, a first tube coupled to the base and extending therefrom, the first tube defining a first bore having an opening at an end of the tube opposite the base, and a second tube, a portion of which is received in the first bore such that the second tube and the first tube form a telescoping relationship, the second tube comprising a first section and a second section, the first section and second section being connected via a clutch, the clutch being configured to enable articulation of the second section relative to the first section about the clutch. The clutch has an outer cross section that is configured to be received in the first bore when the first section is coaxial with the second section.

19 Claims, 7 Drawing Sheets

(56) References Cited

U.S. PATENT DOCUMENTS

| | | | |
|---|---|---|---|
| 3,579,241 A * | 5/1971 | Antista | H01Q 1/084 |
| | | | 343/702 |
| 4,754,945 A | 7/1988 | Diamond | |
| 4,819,902 A | 4/1989 | Wenger et al. | |
| 5,644,320 A * | 7/1997 | Rossi | G06F 1/1616 |
| | | | 343/702 |
| 6,007,032 A | 12/1999 | Kuo | |
| 6,132,018 A * | 10/2000 | McGrath | A47F 3/007 |
| | | | 248/398 |
| 6,138,970 A | 10/2000 | Sohrt et al. | |
| 6,594,371 B2 | 7/2003 | Wetzel et al. | |
| 6,847,830 B1 * | 1/2005 | Vanderhelm | H01Q 1/08 |
| | | | 343/909 |
| 7,118,080 B2 | 10/2006 | Chan et al. | |
| 7,490,429 B2 | 2/2009 | Moody et al. | |
| 7,832,695 B2 | 11/2010 | Ebel et al. | |
| 7,959,120 B2 | 6/2011 | Liao | |
| 8,091,606 B2 * | 1/2012 | Nien | E06B 9/322 |
| | | | 15/144.1 |
| 8,317,152 B1 | 11/2012 | Zhou | |
| 8,567,739 B2 | 10/2013 | Zhou | |
| 8,973,885 B2 | 3/2015 | Bonnet et al. | |
| 2007/0012825 A1 | 1/2007 | Yeh | |
| 2007/0129634 A1 | 6/2007 | Hickey et al. | |
| 2012/0168581 A1 | 7/2012 | Cheng et al. | |
| 2015/0034789 A1 | 2/2015 | Ferguson et al. | |
| 2015/0102187 A1 | 4/2015 | Hennessey et al. | |

OTHER PUBLICATIONS

U.S. Office Action U.S. Appl. No. 14/834,649, dated Jan. 27, 2017, 10 Pages.

\* cited by examiner

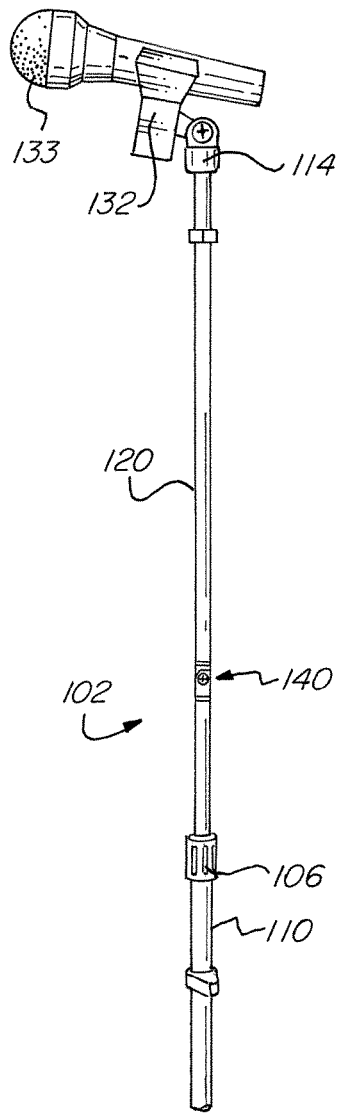
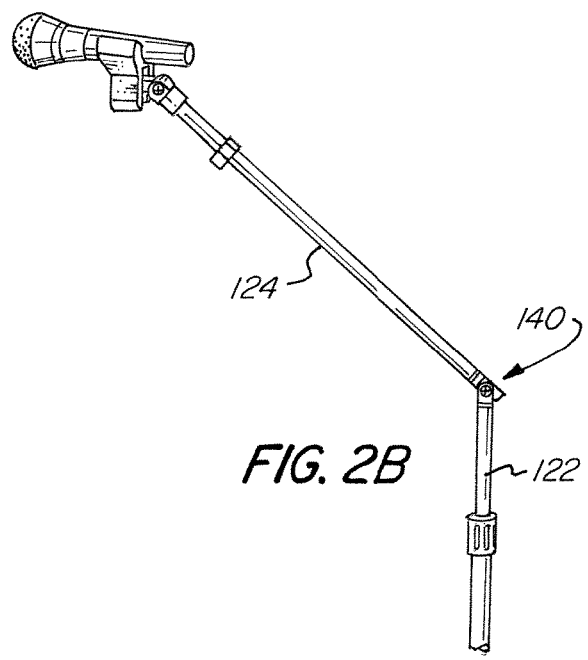
FIG. 2A
FIG. 2B

MICROPHONE STAND HAVING ARTICULATING SHAFT

FIELD OF THE INVENTION

The present invention is directed to an adjustable stand and more specifically to a boom-less stand, such as a microphone stand, with an articulating shaft providing for a microphone position to be moved in a plane.

BACKGROUND OF THE INVENTION

Traditional stands typically include a base, a shaft and a boom arm so that an object (e.g., microphone, sheet music support) attached to the boom can be positioned sufficiently far from the shaft along a plane. This allows, for example, a guitar player to place the microphone directly in front of his mouth without having the upright portion (shaft) of the stand be in the way of the guitar. In some cases, the shaft is made up of telescoping tubes and an adjustment collar, which allows the overall height of the shaft to be adjusted.

However, a major drawback of the traditional stand involves the boom arm. The boom arm is exposed from the shaft and accordingly occupies a large amount of space. The retention and rotation assembly that attaches the boom to the shaft projects beyond the contour of the shaft and occupies a substantial amount of space. As a result, the boom and retention and rotation assembly obstruct a clear view of the performer standing behind the stand. Another drawback of the traditional stand concerns the tedious procedure of adjusting the boom relative to the shaft. That is, the retention and rotation assembly requires locking and unlocking (e.g., loosening and tightening a fastener) in order to adjust the angle of the boom relative to the shaft.

The traditional stand also lacks the capability of being easily arranged (e.g., collapsed, folded up) into a space-efficient and transportable configuration. For example, in order to reduce the amount of space the stand occupies along a plane during transport, one must unlock the retention and rotation assembly and disconnect the boom from the shaft into two separate parts. Such disassembly increases the chance that one or more parts may be lost during transport.

Several microphone stands have been developed to address some of the drawbacks related to boom arms. For example, U.S. Pat. No. 6,007,032 to Kuo discloses a foldable stand assembly for microphones. The assembly is designed with a microphone holder rod mounted above a telescoping shaft using a pivotal seat mechanism. The pivotal seat mechanism includes a seat secured to an upper end of the shaft, a connecting block connected to a lower end of the holder rod, a pin and tension knob for adjusting the inclined status of the holder rod, and a clamping sleeve for securing the holder rod to the connecting block. However, the microphone stand of Kuo fails to minimize view obstruction due to the overall size of the pivotal seat mechanism. The stand does not provide a space-efficient and transportable configuration due to the protruding pin and knob as well as the pivotal seat mechanism's inability to fully collapse into the shaft. Further, the microphone stand of Kuo requires more complex components and procedures for arranging the stand in a transportable configuration. Specifically, to collapse the stand, a user must: (1) unlock the clamping sleeve of the pivotal seat mechanism; (2) shift the holder rod so that its lower end is disposed within the clamping sleeve; (3) relock the clamping sleeve; (4) rotate the holder rod into alignment with the shaft by means of loosening the tension knob and pin; (5) unlock a shaft clamping sleeve so that an upper tube of the shaft is telescopically received within a lower tube of the shaft; (6) unlock the clamping sleeve of the pivotal seat mechanism; (7) shift the holder rod downward so that its lower end is telescopically received within the shaft; (8) relock the clamping sleeve of the pivotal seat mechanism to secure the holder rod relative to the upper tube of the shaft; and (9) relock the shaft clamping sleeve to secure the upper tube of the shaft relative to the lower tube of the shaft.

U.S. Pat. No. 6,594,371 to Wetzel et al. is directed to an articulated microphone boom assembly. The boom assembly includes a first hollow cylindrical telescoping boom, which is attached to a hollow hinge providing articulation with a second hollow cylindrical telescoping boom. The hinge includes a locking mechanism to fix the first boom at several predetermined angles in relation to the second boom. However, the hinge is not integrated fully within either the first boom or the second boom. The microphone stand of Wetzel also fails to provide a space-efficient and transportable configuration. For example, the hinge does not collapse into the first boom. Wetzel instead teaches that the hinge allows for the second boom to be disposed alongside and parallel to the first boom. Such a configuration still does not reduce the amount of space the entire boom assembly occupies along a plane. Moreover, the hinge comprises a pawl which is spring-loaded to engage and disengage one of several defined detent slots. This hinge mechanism can only provide predetermined articulated angles and lacks flexibility in adjusting the first boom relative to the second boom at any angle within a given range. The hinge mechanism requires locking and unlocking the locking mechanism in order to articulate the first boom, and thus does not allow for quick and easy adjustment.

While some microphone stands may provide some improvements over traditional stands, they still suffer from several disadvantages, including requiring a boom arm and a complex retention and rotation assembly. Another such disadvantage is the difficulty involved in adjusting the angle of the retention and rotation assembly. Another such disadvantage is the view obstruction caused by the boom arm and the retention and rotation assembly.

SUMMARY OF THE INVENTION

An objective of the present invention is to remedy the above problems associated with stands with boom arms. The present invention provides for adjustment of the position of an attached object (e.g., microphone, sheet music support) along a plane without requiring a boom arm.

It is an additional objective of the present invention to provide a stand which provides adjustment in the inclination angle of the attached object (and a top/distal portion of the shaft) relative to a bottom/proximal portion of the shaft without use of a tension clutch, such as a tension knob and pin. Further, it is also an objective to provide a pivot mechanism which is easily adjustable and can securely fix the attached object relative to the bottom/proximal portion of the shaft and/or base at any inclination angle.

It is another objective of the present invention to provide a stand that can be arranged into a space-efficient and transportable configuration.

These and other objectives are achieved by providing a stand having a shaft with a pivot-adjustable clutch integrated into the shaft. The pivot-adjustable clutch provides for an upper portion of the shaft to be rotated relative to a lower portion of the shaft at any angle within a range. For example, by means of the pivot-adjustable clutch, a user can easily grab the top portion of the shaft and pivot it towards oneself to find a comfortable angle for his/her application without having to loosen and then retighten any knobs, pins, screws, or bolts. The pivot-adjustable clutch is tight enough to firmly hold the top portion of the shaft, with the weight of an object (e.g., microphone) attached thereto, in a stationary manner after an angle adjustment is made.

The incorporation of the clutch into the shaft eliminates the need for a boom arm and thus allows for elimination of the boom arm. The incorporation of the clutch into the shaft also reduces the size (e.g., width) of the stand, thereby decreasing obstruction of the performer and increasing line of sight for viewers.

Further objectives are achieved by providing a stand having a base, a first tube coupled to the base and extending therefrom, the first tube defining a first bore having an opening at a distal end of the first tube opposite the base, and a second tube, a portion of which is received in the first bore such that the second tube and the first tube form a telescoping relationship. The second tube has a first section and a second section, the first section and second section being connected via a clutch, the clutch being configured to enable articulation of the second section relative to the first section about the clutch. The clutch has an outer cross section that is configured to be received in the first bore when the first section is coaxial with the second section.

In some embodiments, the clutch is made up of a female component having opposing flanges and a male component having a protruding post. The protruding post is coupled between the opposing flanges via a fastener to facilitate articulation of the male component relative to the female component.

Other objectives are achieved by providing a stand having a base, a first tube coupled to the base and extending therefrom, the first tube defining a first bore having an opening at a distal end of the first tube opposite the base, and a second tube, a portion of which is received in the first bore such that the second tube and the first tube form a telescoping relationship, the second tube having a first section and a section second section, the first section and the second section being connected via a clutch, the clutch being configured to enable articulation of the second section relative to the first section about the clutch. The clutch has an outer cross section that is configured to be received in the first bore when the first section is coaxial with the second section, wherein the clutch includes a first component coupled to the first section of the second tube and a second component coupled to the second section of the second tube, both components having a L-shaped mount that engage one another.

Still, other objectives are achieved by providing a stand having a base, a first tube coupled to the base and extending therefrom, the first tube defining a bore with an opening at a distal end of the first tube opposite the base, a second tube, a portion of which is received in the first bore such that the second tube and the first tube form a telescoping relationship, and a clutch coupling a proximal end of the first tube to the base, the clutch being configured to enable pivoting of the first tube relative to the base and to secure the first tube at an adjusted angle relative to the base.

In some embodiments, the clutch is made up of a female component having opposing flanges (U-shaped mount) and a male component having a protruding post. The protruding post of the male component is coupled between the opposing flanges of the female component via a fastener to facilitate articulation of the male component relative to the female component. The female component may be attached to the base while the male component is attached to the first tube. In other embodiments, the clutch includes a first component coupled to the base and a second component coupled to the first tube, both components having an L-shaped mount that engage one another.

Although the present invention has been described as a stand for holding an object, such as a microphone or sheet music support, it can also function as a boom arm, microphone pole, microphone accessory, speaker stand or a percussion stand holding drum hardware and/or percussion instruments.

Other features and aspects of the invention will become apparent from the following detailed description, taken in conjunction with the accompanying drawings, which illustrate by way of example, the features in accordance with embodiments of the invention. The summary is not intended to limit the scope of the invention, which is defined solely by the claims attached thereto.

BRIEF DESCRIPTION OF THE DRAWINGS

FIG. 2A is a side view of a stand, such as a microphone stand, with an articulating shaft in accordance with one embodiment of the present invention in a coaxial state.

FIG. 2B is a side view of the stand of FIG. 2A in a rotated state.

It should be understood that throughout the drawings, corresponding reference numerals indicate like or corresponding parts and features.

DETAILED DESCRIPTION OF THE INVENTION

The following detailed description illustrates the invention by way of example, not by way of limitation of the principles of the invention.

As used herein, the terms "articulate" and "articulation" includes the acts of actuating, rotating, and/or pivoting. The terms "articulate", "actuate", "rotate" and "pivot" are used interchangeably herein, and are intended to have the same meaning, and thus encompass the process of turning, and causing to turn, around on or as if on an axis or center point.

Figure 1:
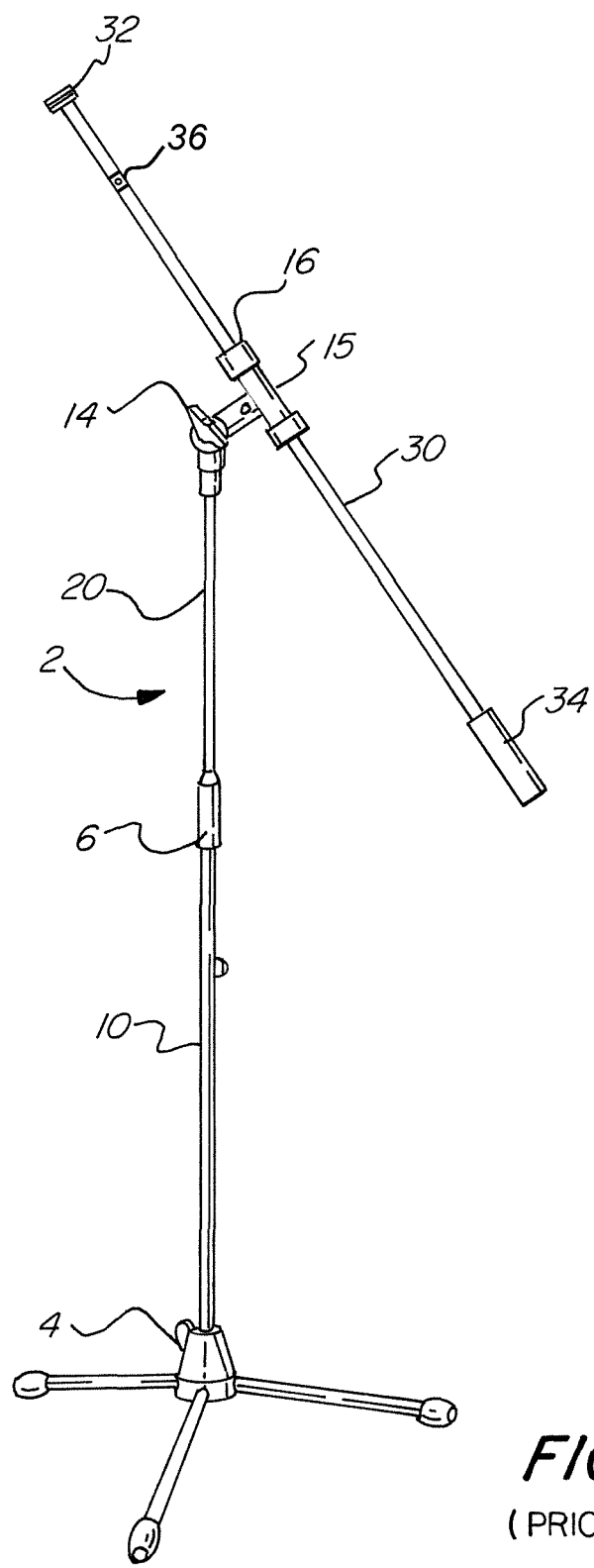
FIG. 1 is a perspective view of a boom microphone stand in accordance with prior art.

FIG. 1 illustrates a boom stand 2, and more specifically a boom microphone stand 2 (also referred to simply as a stand). The stand 2 comprises a base 4. In the embodiment shown in FIG. 1, the base 4 comprises an adjustable tripod leg configuration. However, a person of ordinary skill in the art will understand that other types of bases may be employed, for example a weighted disc.

The stand 2 includes a lower tube 10 and an upper tube 20. A lower end of the lower tube 10 is coupled to the base 4. The lower tube 10 extends along an axis between the lower end and an upper end and has a circular cross section and a bore extending therethrough. The upper tube 20 defines an outer cross section such that the upper tube 20 can be received in the bore extending through the lower tube 10 in a telescoping fashion.

The stand 2 includes an adjustment collar 6 between the lower tube 10 and the upper tube 20. The adjustment collar 6 can be biased to an open position by rotating the adjustment collar in a first direction relative to the lower tube 10 about the axis of the lower tube. In the open position, the upper tube 20 can be translated relative to the lower tube 10. The adjustment collar 6 can be biased to a closed position by rotating the adjustment collar in a second direction relative to the lower tube 10, thereby fixing the position of the lower tube 10 relative to the upper tube 20. In this manner, it is possible to adjust and fix the height of the stand 2.

A retention and rotation assembly 14 is coupled to an upper end of the upper tube 20. Such a retention and rotation assembly is disclosed in pending U.S. application Ser. No. 14/055,312 to Hennessey et al., however, a person of ordinary skill in the art will understand that different assemblies may be used. A boom 30 is slideably received in a bore 15 extending through the retention and rotation assembly 14. The boom 30 extends along an axis between a first end and a second end. A clip 32 is coupled to the first end of the boom 30 and a counterweight 34 is coupled to the second end. In some cases, the boom 30 has a rocker lug 36 which allows for a portion of the boom to bend. The position of the boom 30 relative to the bore 15 can be fixed and released using a clutch 16 in the same manner as described above in relation to the adjustment collar 6 between the lower tube 10 and the upper tube 20. The retention and rotation assembly 14 further allows the boom 30 to be rotated relative to the upper tube 20 about an axis substantially perpendicular to the axis of the upper tube 20. In this manner, the angle of the boom 30, and as a result the position of an object (e.g., microphone) coupled thereon, can be adjusted relative to the upper tube 20. The boom 30 extends the position of the microphone away from the base 4 and tubes 10, 20, so as to provide an area of open space under the microphone for playing a guitar or the like.

A disadvantage of the stand 2 shown in FIG. 1 is that it requires the retention and rotation assembly 14 and the boom 30 to facilitate positioning of the microphone away from the base 4 and the tubes 10, 20. This increases the cost of manufacturing and the complexity of use.

Another disadvantage of the stand 2 shown in FIG. 1 is that a position of the boom 30 cannot be incrementally adjusted without locking and unlocking the retention and rotation assembly 14. If the boom 30 is let go while the assembly 14 is in an open/unlocked position, the boom will fall and fail to maintain its position relative to the upper tube 20. Similarly, when the assembly 14 is locked, it is not possible to adjust the angle of the boom 30 relative to the upper tube 20. As a result, it is difficult to make quick incremental adjustments to the position of the boom.

Still, another disadvantage of the stand 2 shown in FIG. 1 is that the size (e.g., width) of the retention and rotation assembly 14 is greater than the inside diameter of the bore in lower tube 10, thereby preventing the retention and rotation assembly 14 from being received in the bore in lower tube 10.

These and other disadvantages are overcome by a stand having an articulating upper tube. An embodiment of this new type of stand with articulating shaft is illustrated in FIGS. 2-9. These figures, in particular, show a microphone stand as an exemplary embodiment of the stand according to the present invention.

In reference to FIGS. 2A and 2B, a stand 102 in accordance with one embodiment of the present invention is illustrated. The stand 102 comprises a base (see for example base 4 in FIG. 1). The base may comprise an adjustable tripod leg configuration or weighted disc. A lower tube 110 extends from the base and is coupled to an upper tube 120. The lower tube 110 extends along an axis between a lower (proximal) end and an upper (distal) end and has a circular cross section. The lower tube 110 defines a bore extending therethrough. The upper tube 120 defines an outer cross section such that the upper tube 120 can be received in the bore extending through the lower tube 110 in a telescoping fashion.

The stand 102 includes an adjustment collar 106 between the lower tube 110 and the upper tube 120. For example, the adjustment collar 106 is disposed at the upper (distal) end of the lower tube 110. The adjustment collar 106 can be biased to an open position by rotating the adjustment collar 106 in a first direction relative to the lower tube 110 about the axis of the lower tube. In the open position, the upper tube 120 can be translated relative to the lower tube 110. The adjustment collar 106 can be biased to a closed position by rotating the adjustment collar 106 in a second direction relative to the lower tube 110, thereby fixing the position of the lower tube 110 relative to the upper tube 120. In this manner, it is possible to adjust and fix the height of the stand 102.

An attachment clip 132 (e.g., microphone clip) is coupled to an upper end of the upper tube 120 via a clutch 114. A microphone 133 is received in the clip 132 and is rotatable relative to upper tube 120 via the clutch 114 about an axis perpendicular to the upper tube 120.

Unlike the embodiment shown in FIG. 1, the embodiment shown in FIGS. 2 through 7 does not include a boom. Instead, the stand 102 facilitates positioning of the microphone 133 away from the base and tubes 110, 120 by employing an articulating upper tube 120, as illustrated in FIG. 2B. The upper tube 120 comprises a first section 122 and a second section 124. The first section 122 is connected to the second section 124 via a clutch 140 that facilitates articulation of the second section 124 relative to the first section 122.

The clutch 140 enables rotation of the second section 124 of the upper tube 120 relative to the first section 122 of the upper tube 120. For example, in reference to FIG. 2A, the axis of the first section 122 is coaxial with the axis of the second section 124. In reference to FIG. 2B, the second section 124 has been rotated relative to the first section 122 about the clutch 140 so that an axis of the second section 124 bisects the axis of the first section 122 at, for example, approximately 45 degrees. In this manner, the position of the microphone is extended away from the base, the lower tube 110, and first section 122 of the upper tube 120. The clutch is configured to provide for pivot adjustment to any angle within a given range. In some embodiments, the clutch 140 is a friction clutch.

Figure 3A:
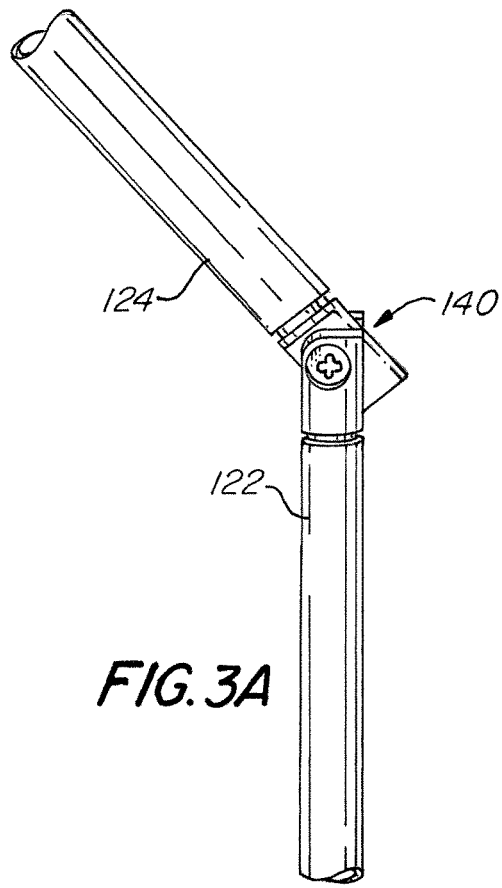
FIG. 3A is a side view of a clutch of the stand of FIG. 2A in accordance with one embodiment, the clutch being in an angled position.
Figure 3B:
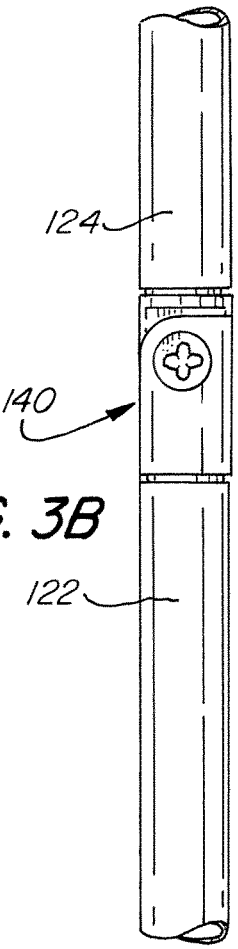
FIG. 3B is a side view of a clutch of the stand of FIG. 2A in accordance with one embodiment, the clutch being in coaxial position.
Figure 4:
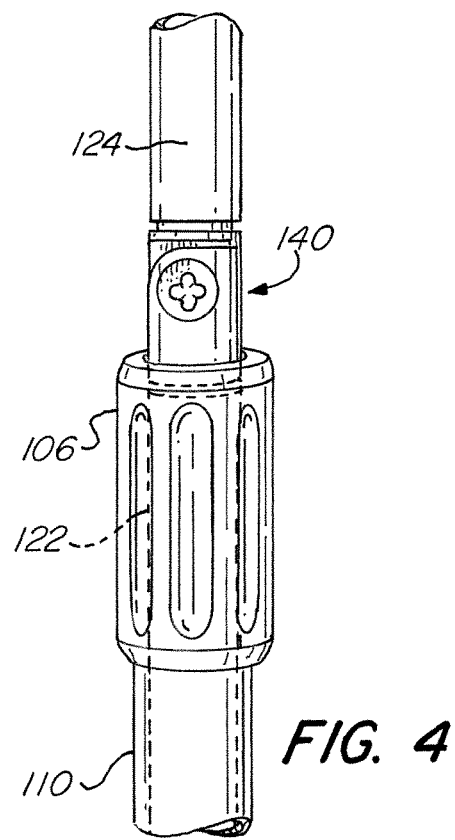
FIG. 4 is a side view of an adjustment collar and a clutch of the stand of FIG. 2A.

FIGS. 3A and 3B further illustrate the clutch 140 and the articulation of the second section 124 relative to the first section 122 about the clutch 140. FIG. 4 illustrates that the clutch 140 is configured so that it has an outside cross section that can be received in the bore of the lower tube 110. In this manner, it is possible to telescope the clutch 140 into the bore of the lower tube 110 when the first section 122 and the second section 124 are in coaxial state, as is illustrated in FIG. 4.

Figure 5:
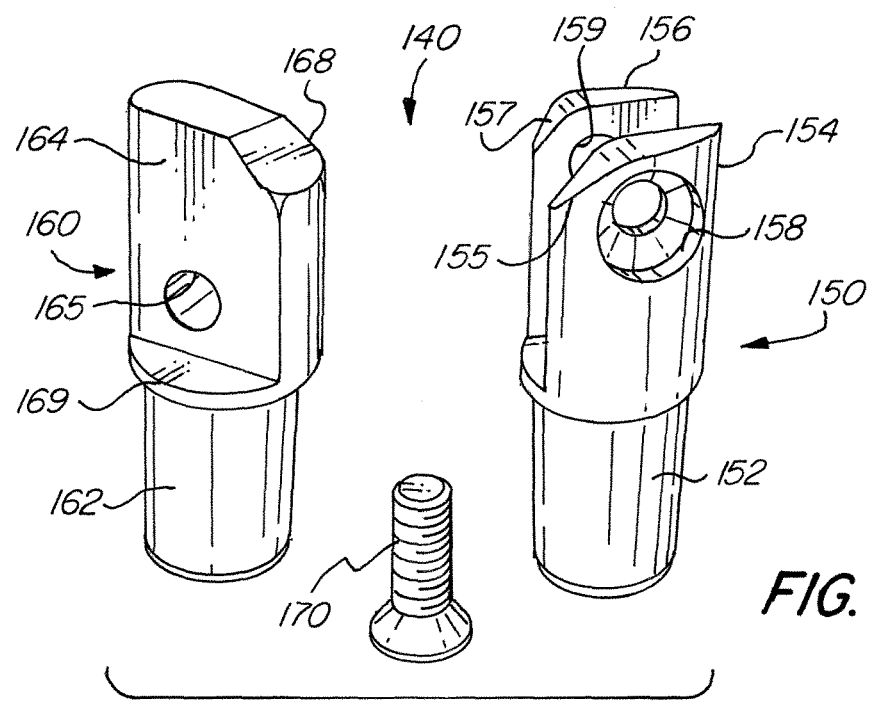
FIG. 5 is a perspective view of components of the clutch of FIGS. 3A-3B in a disassembled configuration.

In reference to FIG. 5, the components of a clutch 140 in accordance with one embodiment of the present invention are shown. The clutch 140 comprises a female section 150 and a male section 160. The female section 150 is coupled to the first section 122 of the upper tube 120. In the embodiment shown, the female section 150 defines a post 152 being receivable in a bore defined by the first section 122. In some embodiments of the present invention, the female section 150 of the clutch 140 may be integral with the first section 122 of the upper tube 120. Likewise, the male section 160 is coupled to the second section 124 of the upper tube 120. In the embodiment shown, the male section 160 defines a post 162 that is receivable in a bore defined by the second section 124. In some embodiments of the present invention, the male section 160 of the clutch 140 may be integral with the second section 124 of the upper tube 120. It should be understood that in some embodiments of the present invention, the male section 160 is coupled to the first section 122 of the upper tube 120 and the female section 150 is coupled to the second section 124 of the upper tube 120.

The female section 150 defines a U-shaped mount on an end opposite the post 152. The U-shaped mount comprises a first flange 154 extending upward from the female section 150 and a second flange 156 extending upward from the female section 150. The first flange 154 and the second flange 156 are substantially parallel and define a slotted opening therebetween. The top of each flange 154, 156 comprises a stop surface 155, 157 that is configured to limit the extent to which the male section 160 can rotate relative to the female section 150. The first flange 154 comprises a through hole 158 and the second flange 156 comprises a threaded hole 159. The holes are configured such that a threaded fastener 170 can be received through the through hole 158 and threaded into the threaded hole 159. The through hole 158 also includes a recess so that the head of the fastener 170 may be seated therein. The recess of the through hole 158 allows for the head of the fastener 170 to be flush with or disposed below an outer surface of the first flange 154 upon inserting the fastener 170 into holes 158, 159 (see FIG. 6).

The male section 160 defines a protruding post 164 opposite the post 162. The protruding post 164 extends upward from a center of the male section 160. The protruding post 164 is configured to be received between the opposing flanges 154, 156 of the female section 150. The protruding post 164 comprises a through hole 165 that aligns with the respective holes 158, 159 of the opposing flanges 154, 156. It is preferred that the through hole 165 of the protruding post 164 has a smooth surface, and is not threaded, to facilitate articulation of the male section 160 relative to the female section 150

Figure 6:
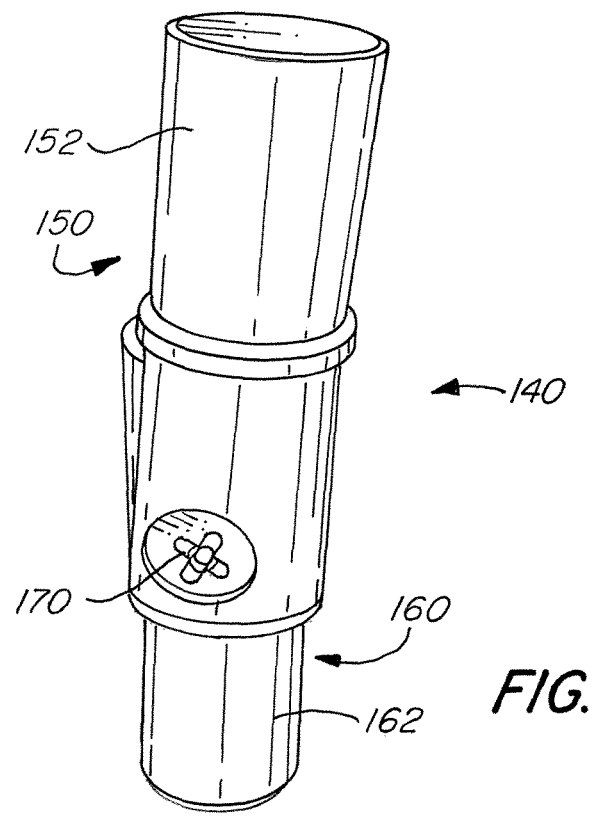
FIG. 6 is a perspective view of components of the clutch of FIGS. 3A-3B in an assembled configuration.

The protruding post 164 is received between the opposing flanges 154, 156 and is coupled thereto by the threaded fastener 170. The threaded fastener 170 is inserted through the hole 158 in the first flange, through hole 165 in the protruding post 164, and received in threaded engagement in the hole 159 in the second flange, as illustrated in FIG. 6 (note, FIG. 6 shows the clutch 140 in an upside orientation). By increasing the tension on the fastener 170, the opposing flanges are drawn together causing a clamping force on the protruding post 164. In one embodiment of the present invention, the fastener is tightened so that the flanges 154, 156 compress the protruding post 164 to an extent that the angle of the second section 124 relative to the first section 122 can be adjusted. After an adjustment, the compression of the flanges—i.e., the friction between the flanges and the protruding post—maintains the position of the second section 124 relative the first section 122 without further adjustment or tightening of the fastener 170. This is true even when a microphone or other weighted object is connected to the remote end of the second section 124.

In reference to FIG. 5, the top of each flange 154, 156 comprises a stop surface 155, 157. The stop surfaces 155, 157 are configured to limit the extent of articulation of the second section 124 relative to the first section 122. The male section 160 comprises a radial protrusion 169 at a bottom area of the protruding post 164. The outer contour (circular cross section) of the radial protrusion coincides with the outer contour (circular cross section) that the opposing flanges of the female component collectively form. Accordingly, when the female section of the clutch 140 is coaxial with the male section, a smooth transition is provided between the outer contours/surfaces of the female and male sections. As articulation reaches a maximum designed extent (e.g., maximum angle), the radial protrusion contacts the stop surfaces 155, 157, limiting the articulation thereof. It is preferred that articulation is limited to 45 degrees past vertical to ensure balance of the stand 102. The protruding post 164 has a relief 168 formed therein to further facilitate articulation of the second section 124 relative to the first section 122, and more specifically the male section 160 relative to the female section 150. In some embodiments of the present invention, the insides surfaces of the flanges 154, 156 and interfacing outside surfaces of the protruding post 164 define a relief pattern so as to inhibit unwanted slippage of the second section 124 relative to the first section 122.

Figure 7:
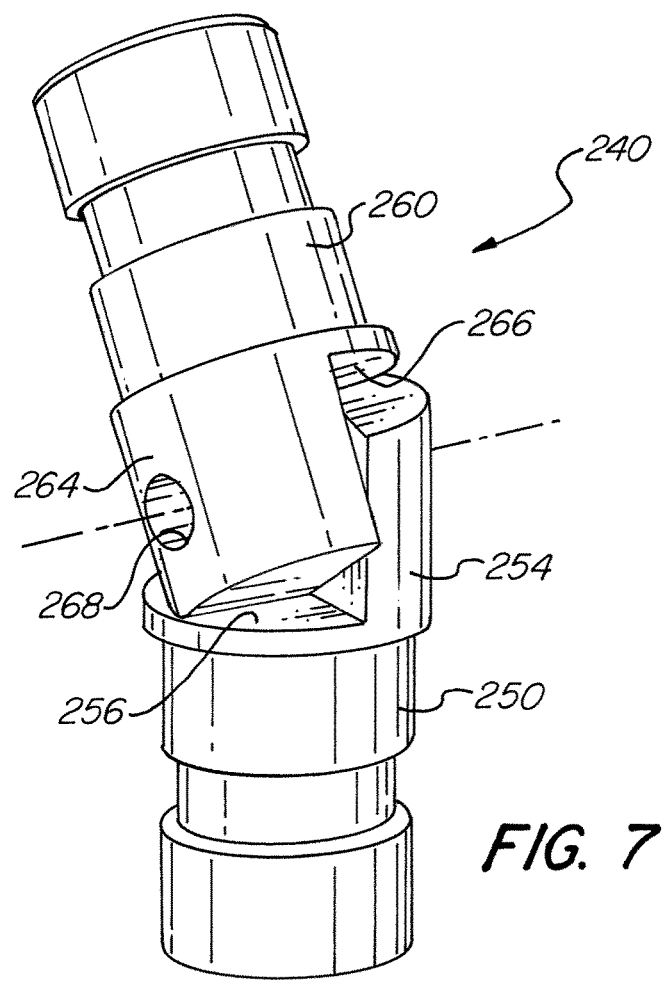
FIG. 7 is a perspective view of a clutch of the stand of FIG. 2A in accordance with another embodiment, the clutch being in an angled position.

In reference to FIG. 7, a clutch 240 in accordance with a second embodiment of the present invention is shown. The clutch 240 comprises a bottom section 250 and a top section 260. The bottom section 250 is coupled to the first section 122 of the upper tube 120. Likewise, the top section 260 is coupled to the second section 124 of the upper tube 120. It should be understood that in some embodiments of the present invention the top section 260 is coupled to the first section 122 of the upper tube 120 and the bottom section 250 is coupled to the second section 124 of the upper tube 120.

The bottom section 250 defines an L-shaped mount. The L-shaped mount comprises a flange 254 that extends upward from the bottom section 250 and the L-shaped mount defines a flat surface 256 that is perpendicular to the flange 254. In similar respect, the top section 260 defines an L-shaped mount that is configured to mate with the L-shaped mount of the bottom section 250. The L-shaped mount of the top section 260 comprises a flange 264 that extends from the top section 260 and the L-shaped mount defines a flat surface 266 that is perpendicular to the flange 264.

The top of the flange 254 of the bottom section 250 comprises a stop surface that is configured to engage the flat surface 266 of the top section 260 to limit the extent to which the top section 260 can rotate or articulate relative to the bottom section 250. In some embodiments, the top of the flange 264 of the top section 260 also comprises a stop surface that is configured to limit the extent to which the bottom section 250 can rotate or articulate relative to the top section 260. The flange 254 comprises a through hole (not shown in FIG. 7). The hole is configured such that a rod or a fastener can be received in the through hole. The flange 264 similarly comprises a through hole 268. The hole 268 is configured such that the rod or fastener can be received therein. In some embodiments, one or both of the through holes of the first and second sections may be a threaded hole, and the fastener may be a threaded fastener. To simplify manufacturing of the clutch, the L-shaped mount of the top section 260 can have the same configuration (e.g., shape) as the L-shaped mount of the bottom section 250.

The L-shaped mount of the bottom section 250 mates with the L-shaped mount of the top section 260 as shown in FIG. 7. A rod or similar fastener is received in the through hole in each flange 254, 264 so as to facilitate rotation of the top section 260 relative to the bottom section 250 and to facilitate retention of the flanges relative to each other. An inner surface of the flange 254 is held in communication with (e.g., contacts) an inner surface of the flange 264 via the fastener (e.g., fastener 170). By increasing friction between the surfaces of the flanges 254, 264 using the fastener, the amount of force required to articulate the top section 260 relative to the bottom section 250 may be increased (or decreased). In the embodiment shown, the friction can be increased so that the friction between the surfaces maintains the position of the top section 260 relative the bottom section 250 without further adjustment or support. This is true even when a microphone or other weighted object is connected to the remote end of the upper tube 124. Like the clutch 140, the clutch 240 is able to maintain a set angle between the first section 122 and the second section 124 without adjustment or tightening of the fastener. The embodiment shown in FIG. 7 includes similar stop surfaces as those shown in FIG. 5 to limit the extent of articulation of the second section of the upper tube relative to the first section of the upper tube.

Figure 8:
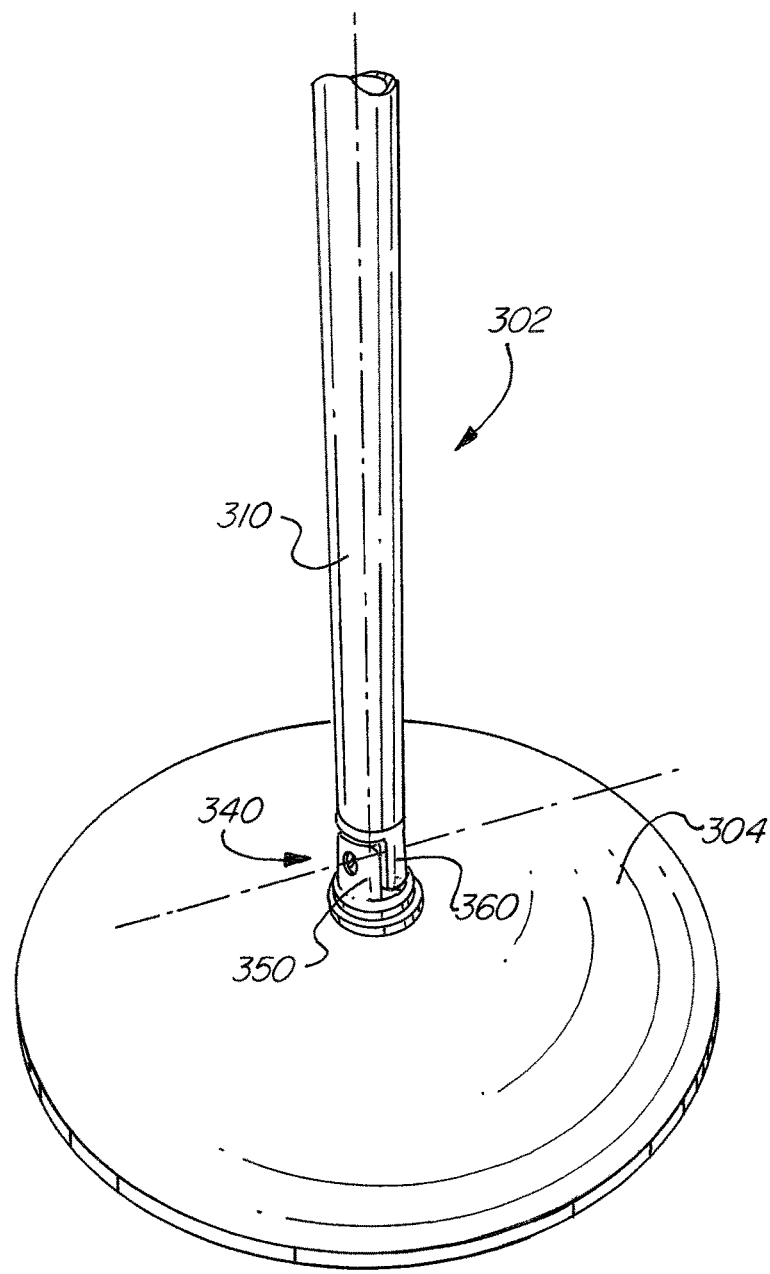
FIG. 8 is a perspective view of a stand, such as a microphone stand, with an articulating shaft in accordance with another embodiment of the present invention in a state perpendicular to a base.
Figure 9:
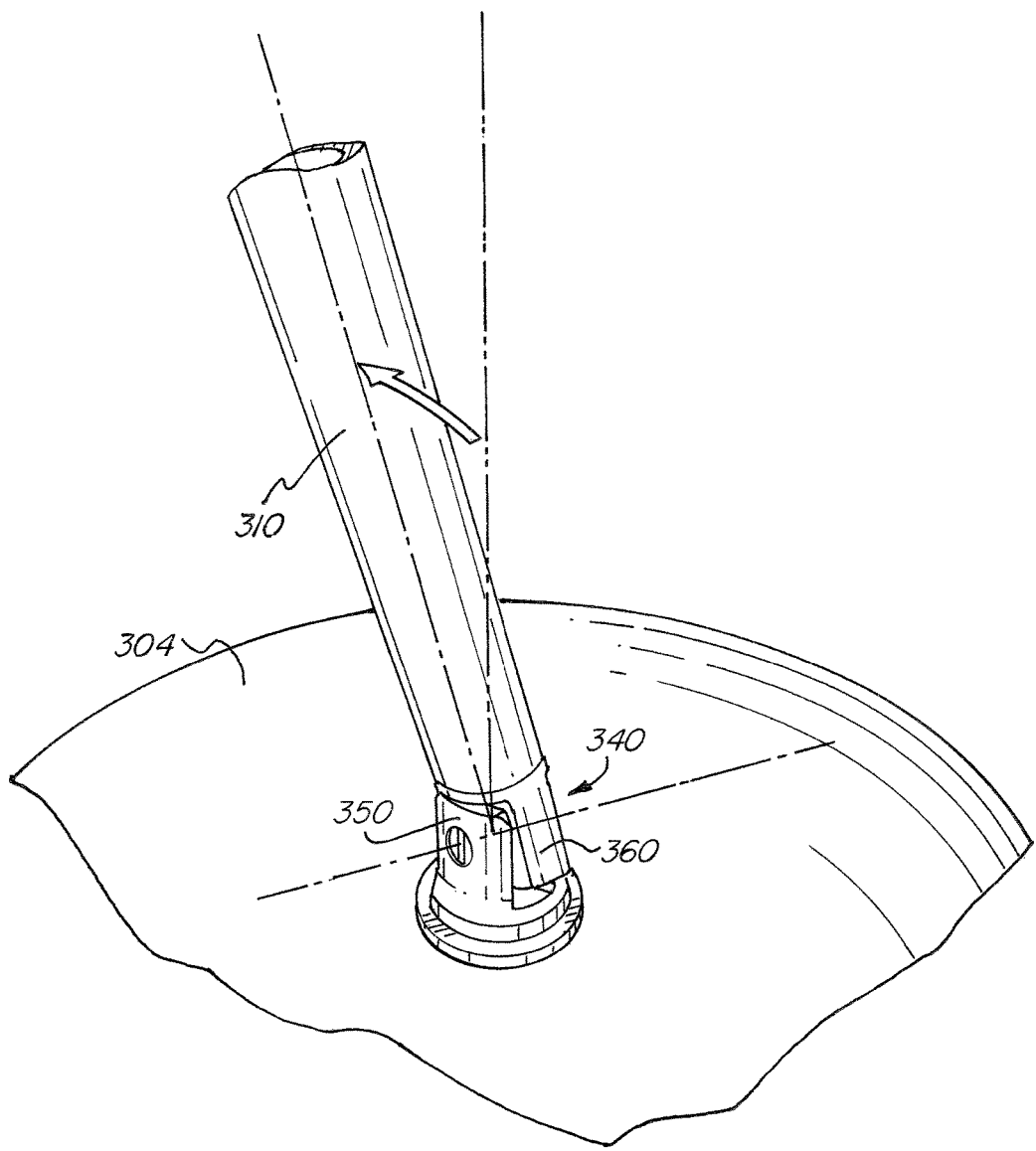
FIG. 9 is a perspective view of the stand of FIG. 8 in a rotated state.

In reference to FIGS. 8 and 9, a stand 302 in accordance to another embodiment of the present invention is illustrated. The stand 302 exhibits some of the same features of the stand 102 in FIGS. 2A and 2B. The stand 302 includes a base 304, which is shown as a weighted disc. However, the base 304 may be an adjustable tripod leg configuration. The stand 302 also includes a shaft, which is formed by a lower tube 310 and an upper tube (see for example upper tube 120 in FIGS. 2A and 2B). The lower tube 310 has a bore which extends therethrough. An opening to the bore is provided at the distal end of the lower tube 310. The upper tube is dimensioned such that its outer cross section corresponds to the size (e.g., diameter) of the bore in the lower tube 310. Accordingly, the upper tube can be received through the opening into the bore of the lower tube 310 in a telescoping fashion.

The stand 302 includes an adjustment collar (see collar 106 in FIGS. 2A and 2B) between the lower tube 310 and the upper tube. The adjustment collar can be biased to an open position by rotating the collar in a first direction relative to the lower tube 310 about the axis of the lower tube, or to a closed positioned by rotating the collar in a second direction opposite the first direction. The collar configured in the closed position fixes the position of the lower tube 310 relative to the upper tube. The adjustment collar provides the ability to increase or decrease the height of the stand 302.

The lower tube 310 is coupled to the base 304 and extends therefrom. In particular, a clutch 340 couples the lower tube 310 to the base 304 and facilitates articulation of the lower tube 310 relative to the base 304. FIG. 8 shows the axis of the lower tube 310 is perpendicular to the base 304 and more so at the point where the lower tube is coupled to the base. In reference to FIG. 9, the lower tube 310 has been rotated relative to the base 304 about the clutch 340 so that the axis of the lower tube is non-perpendicular to the base, for example 75 degrees between the base and the axis of the lower tube. The clutch 340 is configured to provide pivot adjustment of the lower tube to any angle within a given range. As a result, the position of an object (e.g., microphone) attached to the stand (e.g., upper tube) may be extended away from the base 304. Once adjusted, the clutch 340, as a friction clutch, is able to hold the lower tube 310 at the adjusted angle.

The clutch 340 in some embodiments has the same configuration as the clutch 140 in FIGS. 5 and 6. Accordingly, the clutch 340 comprises a female section 350 and a male section 360. The female section 350 is coupled to base 304. In the embodiment shown in FIGS. 8 and 9, the female section 350 defines a post being receivable in a bore formed in the base. Alternatively, the female section 350 of the clutch 340 may be integral with the base 304. The male section 360 is coupled to the lower tube 310. In the embodiment shown in FIGS. 8 and 9, the male section 360 defines a post that is receivable in a bore defined by lower tube 310. The male section 360 of the clutch 340, however, may be integral with the lower tube 310. It should be understood that in some embodiments of the present invention, the male section 360 is coupled to base 304 and the female section 350 is coupled to the lower tube 310.

In other embodiments, the clutch 340 has the configuration of the clutch 240 shown in FIG. 7. As such, the clutch 340 comprises a bottom section and a top section. The bottom section is coupled to the base 304, while the bottom section is coupled to the lower tube 310. Alternatively, the bottom section of the clutch 340 is coupled to the lower tube 310, while the top section of the clutch 340 is coupled to the base 304. The bottom section defines an L-shaped mount, which includes a flange that extends upward from the bottom section (see FIG. 7) and which defines a flat surface that is perpendicular to the flange. Similarly, the top section defines an L-shaped mount that is configured to mate with the L-shaped mount of the bottom section. The L-shaped mount of the top section comprises a flange that extends from the top section and the L-shaped mount defines a flat surface that is perpendicular to the flange (see FIG. 7). With this particular configuration of the clutch, the L-shaped mount of the bottom section mates with the L-shaped mount of the top section.

Although not shown in FIGS. 8 and 9, the stand 302 may also include an attachment clip similar to the clip 132 shown in FIGS. 2A and 2B. As such, an object or microphone can be attached to the upper tube of the shaft 302.

It should be understood that the stand in accordance with the present invention is not limited to supporting a microphone and that other elements, for example a tablet computer, sheet music support, a percussion component such a drum or cymbal, or a speaker, may be supported using the novel articulating stand.

It should further be understood to a person of ordinary skill in the art that different configurations of the stand are possible. For example, in some embodiments, the stand does not include a lower tube. In yet other embodiments, the clutch may be integrated into the lower tube rather than the upper tube. In yet other embodiments of the present invention, the stand may include a plurality of clutches in accordance with the present invention so as to provide multiple points of articulation. For example, the stand may comprise both the clutch 140 as shown in FIGS. 2A and 2B and the clutch 340 as shown in FIGS. 8 and 9.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A stand, comprising:
   a base to support the stand on a surface;
   a first tube coupled to the base and extending therefrom, the first tube defining a bore having an opening at a distal end of the first tube opposite the base;
   a second tube, a portion of which is received in the bore such that the second tube telescopes into the first tube, a distal end of the second tube having an adapter configured to connect at least one of a microphone or a microphone accessory to the second tube; and
   a clutch coupling a proximal end of the first tube to the base, the clutch being configured to enable pivoting of the first tube relative to the base and to secure the first tube at an angle relative to the base
   wherein the clutch comprises:
      a female component having opposing flanges; and
      a male component having a protruding post;
      wherein the protruding post is coupled between the opposing flanges via a fastener to facilitate articulation of the male component relative to the female component
   wherein the clutch includes a stopper to limit an extent of articulation, the stopper having:
      stop surfaces on a top of each opposing flange; and
      a radial protrusion disposed at a bottom portion of the protruding post of the male component;
      the radial protrusion being configured to contact the stop surfaces of the opposing flanges to limit the extent of articulation to a maximum angle.

2. The stand of claim 1, wherein
   the female component of the clutch has a post that is receivable within a bore of the base to couple the female component to the base; and
   the male component of the clutch has a post that is receivable within a bore of the first tube at the proximal end of the first tube to couple the male component to the first tube.

3. The stand of claim 1, wherein
   the female component of the clutch has a post that is receivable within a bore of the first tube at the proximal end of the first tube to couple the female component to the first tube; and
   the male component of the clutch has a post that is receivable within a bore of the base to couple the male component to the base.

4. The stand of claim 1, wherein the clutch comprises a first component coupled to the base and a second component coupled to first tube, each component having an L-shaped mount that mates with the other.

5. The stand of claim 4, wherein each of the L-shaped mounts of both components comprises a flat surface and a flange extending perpendicular to the flat surface to provide complementary engagement.

6. The stand of claim 5, wherein an end of the flange of the first component comprises a stop surface, the stop surface being configured to contact the flat surface of the second component to limit an extent of articulation.

7. The stand of claim 5, wherein each flange of the first and second components includes a through hole configured to receive a fastener for coupling the first component and second component together.

8. The stand of claim 4, wherein at least one of the first component of the clutch is integrated with the first tube or the second component of the clutch is integrated with the base.

9. The stand of claim 1, wherein at least one of the female component is integrated with the first tube or the male component is integrated with the base.

10. The stand of claim 1, wherein at least one of the female component is integrated with the base or the male component is integrated with the first tube.

11. The stand of claim 1, wherein
    the opposing flanges of the female component each include a through hole; and
    the protruding post of the male component includes a through hole, said through hole of the protruding post is configured to align with the through holes of the opposing flanges to receive the fastener for coupling the female component to the male component.

12. The stand of claim 11, wherein
    one of the through holes of the opposing flanges is a threaded hole; and
    the fastener is a threaded fastener that is configured to engage threads of the threaded hole that is within the diameter of the first tube.

13. The stand of claim 11, wherein the fastener pulls the opposing flanges toward one another to create a clamping force on the protruding post.

14. The stand of claim 13, wherein the opposing flanges compress on the protruding post so that an angle of the first tube relative to the base is adjustable, and after adjustment, friction between the opposing flanges and the protruding post maintains the angle of the first tube relative to the base without adjusting or tightening the fastener.

15. The stand of claim 1, wherein the protruding post has a relief formed therein to facilitate articulation of the first tube relative to the base.

16. The stand of claim 1, wherein inner surfaces of the opposing flanges and an outer surface of the protruding post comprise a relief pattern configured to inhibit slippage of the first tube relative to the base.

17. The stand of claim 1, further comprising an adjustment collar disposed at the distal end of the first tube, the adjustment collar being configured to secure the second tube relative to the first tube.

18. A stand, comprising:
    a base to support the stand on a surface;
    a first tube coupled to the base and extending therefrom, the first tube defining a bore having an opening at a distal end of the first tube opposite the base;
    a second tube, a portion of which is received in the bore such that the second tube telescopes into the first tube, a distal end of the second tube having an adapter configured to connect at least one of a microphone or a microphone accessory to the second tube; and
    a clutch coupling the proximal end of the first tube to the base, the clutch being configured to enable pivoting of the first tube relative to the base and to secure the first tube at an angle relative to the base;
    wherein the clutch comprises a female component having opposing flanges, a male component having a protruding post; and wherein the protruding post is coupled between the opposing flanges via a fastener to facilitate articulation of the male component relative to the female component;
    the female component of the clutch has a post that is receivable within a bore of the base to couple the female component to the base, and the male component of the clutch has a post that is receivable within a bore of the first tube at the proximal end of the first tube to couple the male component to the first tube.

19. A stand, comprising:

a base to support the stand on a surface;

a first tube coupled to the base and extending therefrom, the first tube defining a bore having an opening at a distal end of the first tube opposite the base;

a second tube, a portion of which is received in the bore such that the second tube telescopes into the first tube, a distal end of the second tube having an adapter configured to connect at least one of a microphone or a microphone accessory to the second tube;

a clutch coupling the proximal end of the first tube to the base, the clutch being configured to enable pivoting of the first tube relative to the base and to secure the first tube at an angle relative to the base;

wherein the clutch comprises a female component having opposing flanges, a male component having a protruding post; and wherein the protruding post is coupled between the opposing flanges via a fastener to facilitate articulation of the male component relative to the female component;

wherein the female component of the clutch has a post that is receivable within a bore of the first tube at the proximal end of the first tube to couple the female component to the first tube; and the male component of the clutch has a post that is receivable within a bore of the base to couple the male component to the base.

* * * * *